US012674854B2

(12) United States Patent
Friedrichs et al.

(10) Patent No.: US 12,674,854 B2
(45) Date of Patent: Jul. 7, 2026

(54) COMPACT MACHINE LEARNING ARCHITECTURE FOR WIDEBAND DIRECTION FINDING WITH CIRCULAR ANTENNA ARRAYS

(71) Applicant: The Regents of the University of Colorado, a body corporate, Denver, CO (US)

(72) Inventors: Gaeron R. Friedrichs, Boulder, CO (US); Mohamed Ali Elmansouri, Boulder, CO (US); Dejan S. Filipovic, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 335 days.

(21) Appl. No.: 18/089,018

(22) Filed: Dec. 27, 2022

(65) Prior Publication Data

US 2023/0204704 A1 Jun. 29, 2023

Related U.S. Application Data

(60) Provisional application No. 63/294,753, filed on Dec. 29, 2021.

(51) Int. Cl.
*G01S 3/46* (2006.01)
*G01S 3/64* (2006.01)
*G06N 20/00* (2019.01)
(52) U.S. Cl.
CPC .................................... *G01S 3/46* (2013.01); *G01S 3/64* (2013.01); *G06N 20/00* (2019.01)

(58) Field of Classification Search
CPC .............. G01S 3/46; G01S 3/64; G06N 20/00
USPC .......................................................... 342/442
See application file for complete search history.

(56) References Cited

U.S. PATENT DOCUMENTS

2013/0038487 A1* 2/2013 Carey ........................ G01S 3/26
                                                                342/427
2019/0219660 A1* 7/2019 Cordourier Maruri .....................
                                                                G01S 3/8034

OTHER PUBLICATIONS

Doan et al. "DOA Estimation of Multiple Non-coherent And Coherent Signals using element transposition of covariance matrix," April 2020ICT Express 6(2), DOI:10.1016/j.icte.2020.03.008, License CC BY-NC-ND 4.0 (Year: 2020).*
Yuan et al. "Unsupervised Learning Strategy for Direction-of-Arrival Estimation Network," IEEE Signal Processing Letters ( vol. 28) pp. 1450-1454 Date of Publication: Jul. 9, 2021 (Year: 2021).*
Guo et al. "DOA Estimation Method Based on Cascaded Neural Network for Two Closely Spaced Sources," DOI:10.1109/LSP.2020. 2984914Corpus ID: 216328881 (Year: 2020).*
(Continued)

*Primary Examiner* — Samarina Makhdoom
(74) *Attorney, Agent, or Firm* — Workman Nydegger

(57) ABSTRACT

A computer system for angle of arrival estimation receives one or more snapshots from a circular array of antennas. The computer system processes the one or more snapshots for amplitude and/or phase-based direction finding using two cascaded algorithms. The first algorithm of the two cascaded algorithms is configured to identify a target subregion from which a signal arrives. The second algorithm of the two cascaded algorithms is configured to identify a direction of the signal within the target subregion.

14 Claims, 3 Drawing Sheets

(56) References Cited

OTHER PUBLICATIONS

Gong et al. "Computationally Efficient Direction-of-Arrival Estimation Algorithms for a Cubic Coprime Array," Algorithms for a Cubic Coprime Array. Dec. 25, 2021, Sensors 2022, 22, 136. https://doi.org/10.3390/s22010136 (Year: 2021).*

Chen et al., "Novel Approach to 2D DOA Estimation for Uniform Circular Arrays Using Convolutional Neural Networks," Hindawi International Journal of Antennas and Propagation vol. 2021, Article ID 5516798, 15 pages, https://doi.org/10.1155/2021/5516798 (Year: 2021).*

Guo et al., "DOA Estimation Method Based on Cascaded Neural Network for Two Closely Spaced Sources," IEEE Signal Processing Letters, vol. 27, 2020 (Year: 2020).*

Yuan et al., "Unsupervised Learning Strategy for Direction-of-Arrival Estimation Network," IEEE Signal Processing Letters, vol. 28, 2021 (Year: 2021).*

* cited by examiner

COMPACT MACHINE LEARNING ARCHITECTURE FOR WIDEBAND DIRECTION FINDING WITH CIRCULAR ANTENNA ARRAYS

CROSS-REFERENCE TO RELATED APPLICATIONS

This application claims the benefit of and priority to U.S. Provisional Patent Application Ser. No. 63/294,753 filed on 29 Dec. 2021 and entitled "COMPACT MACHINE LEARNING ARCHITECTURE FOR WIDEBAND DIRECTION FINDING WITH CIRCULAR ANTENNA ARRAYS," which application is expressly incorporated herein by reference in its entirety.

GOVERNMENT RIGHTS

This invention was made with government support under contract DGE1650115 awarded by the National Science Foundation. The government has certain rights in the invention.

BACKGROUND

Angle-of-arrival (AoA) estimation, or radio direction finding (DF), sees applications across many fields including navigation, electronic warfare, communications, remote sensing, and indoor localization, just to name a few. Fundamentally, AoA estimators compare the received signal features from multiple sensor channels. For example, these systems can contrast amplitude information, phase information, or both. While, intuitively, utilization of the complex signal enables more accurate AoA estimation, amplitude-only direction finding (AODF) systems maintain relevance in the context of robust, low-cost, and low-complexity receivers. They also see further demand due to the emergence of advanced, ultrawideband, low latency receivers, where the phase information retrieval in the traditional sense may be intricate or incomplete. Some DF (and AODF) methodologies require repeated sampling (i.e. multiple snapshots), which is suboptimal for resolving fast moving targets, supporting large sensor arrays and minimizing computational time and cost.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments comprise computer systems, computer-implemented methods, and computer-readable media for angle of arrival estimation. Disclosed embodiments receive one or more snapshots from a circular array of antennas. Disclosed embodiments then process the one or more snapshots for amplitude and/or phase-based direction finding using two cascaded algorithms. The first algorithm of the two cascaded algorithms is configured to identify a target subregion from which a signal arrives. The second algorithm of the two cascaded algorithms is configured to identify a direction of the signal within the target subregion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
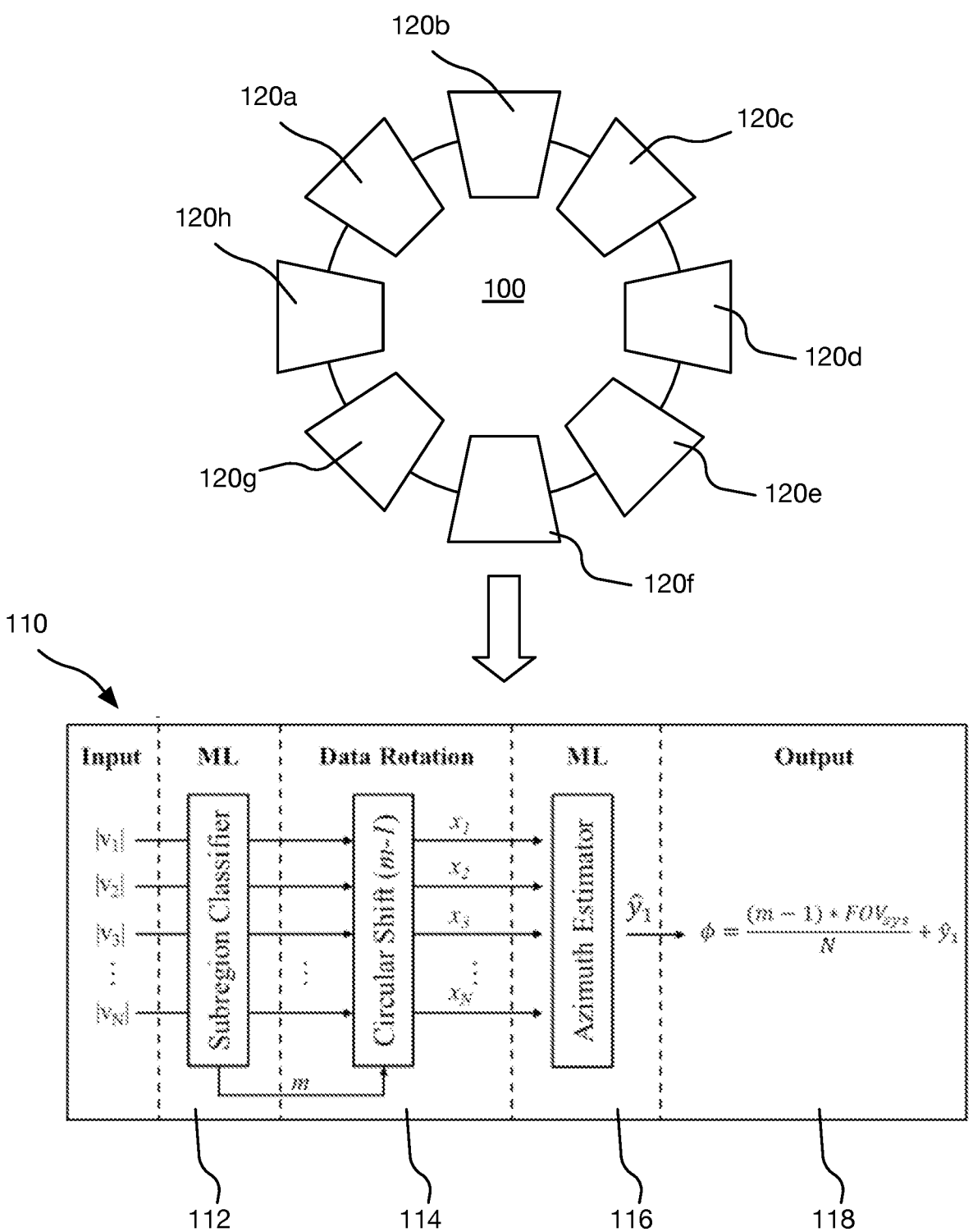
FIG. 1 depicts a schematic of a circular array and a system for angle of arrival estimation.

FIG. 1 depicts a schematic diagram of a circular array 100 of antennas 120(a-h) in communication with an embodiment of a generalized ML-based amplitude-only direction finding (AODF) system 110. Here, VN is the voltage from the sensor, m is the subregion the signal falls in, XN is the subregion-adjusted voltage, and $\hat{y}_1$ is the output of the system from which the azimuthal AoA is extracted. One will appreciate that the present disclosure could also be directed towards a phase-only direct finding system, a phase and amplitude direction finding system, or any other analogous system.

The number of snapshots a system requires can be an important consideration for many applications. In at least one embodiment, phase may be required, and a covariance matrix is estimated. Notable pre-/post-processing may be required. At least one embodiment disclosed herein comprises a single-snapshot, machine-learning based algorithm for AODF—intended to retrofit and augment an already existing array 100.

Two cascaded neural networks (NNs) may be used. A first algorithm 112 may determine the subregion from which the signal arrives. A data rotation 114 can then perform a circular shift before providing data to the second algorithm 116. As such, the first algorithm 112 influences the transformation of the input vector in such a way that the angle of arrival (AoA) estimation model can be recycled across different observation subregions (in this example octants). Stated differently, in at least one embodiment, the second algorithm 116 operates independent of an angular location of the subregion identified within the first algorithm 112. For instance, the second algorithm 116 may receive a circularly shifted input such that the second algorithm 116 is unaware of the actual subregion identified by the first algorithm 112. Instead, the second algorithm 116 may only determine the direction of the signal within the bounds of the generic subregion that is determined based upon the shifted inputs.

This is notably different than the conventional architectures that require deployment of M parallel models/networks for M observation sectors. The reduction in system size and complexity is possible such that deployment of only one AoA estimator is required for M observation sectors, each corresponding to a receiver. These models may outperform their correlation-method counterparts in the presence of moderate noise. Additionally, they do so faster, in a single snapshot, facilitating near real-time operation, while requiring less storage and fewer computational resources upon deployment.

At least one embodiment comprises an antenna configuration that is an 8-element circular array 100 of half-cut combined transverse electromagnetic (TEM) horn and loop antennas 120(a-h), as shown in FIG. 1. This example array 100 may comprise an array and ground plane radii of 12 cm and 35 cm, respectively. The array elements may comprise impedance matched with S11<−10 dB over most of the operating frequency band (1.5-5.5 GHZ). The measured and simulated single-element peak gains at θ=90°. In some embodiments this gain information is used in computing the actual response of the system to an incident plane wave.

A plane-wave-to-terminal-voltage synthesis approach may be used to compute the voltages at an antenna's terminals using its complex radiated far field, impedance match, and polarization information. Herein, a single, linearly copolarized (i.e., vertically polarized) incident plane wave is assumed. Thus, the simplified expression to compute the voltage magnitudes at terminal i is:

$$|v_i| = \left| -j * E_0 * \frac{\lambda}{\sqrt{4\pi}} * \sqrt{G_r(f, \theta, \phi)} * a_{co}(f, \theta, \phi)^* \right| \qquad \text{Equation 1}$$

where $E_o$ is the amplitude of the incident plane wave, $\lambda$ is the wavelength of the incident plane wave, and G, is the realized gain of the receiving antenna as a function of frequency and angle. The quantity $a_{co}$, the normalized complex polarization state, is computed as:

$$a_{co}(f, \theta, \phi) = \frac{E_{copol.}^{rad.}(f, \theta, \phi)}{\sqrt{\left|E_{copol.}^{rad.}(f, \theta, \phi)\right|^2 + \left|E_{xpol.}^{rad.}(f, \theta, \phi)\right|^2}} \qquad \text{Equation 2}$$

in which E is the electric field component of the complex radiated far field of the antenna. In simulation, these values are obtained from Ansys HFSS, where the structure was designed and analyzed.

The deployed concept can be formulated quite generally. At a high level, the disclosed embodiment provides a mapping between a particular set of inputs and outputs. Feedforward NNs, the structures used in this work, are directed acyclic graphs with layers of interconnected nodes. Inputs to the system propagate through the weighted connections and have the node functions applied to them to inevitably yield the output. An embodiment of a deep neural network architecture may comprise an input layer of width 4, 6 hidden layers of width 8, and an output layer of width 2. Layers of nodes other than the input and output layers are considered hidden, and the presence of two or more hidden layers constitutes a deep neural network architecture.

Obtaining a working model may require optimization of the network's weights through training. The network is exposed to a set of inputs and the corresponding outputs—which ultimately facilitates an update in the network's weights, depending on how the optimization algorithm functions. Many methods exist for this optimization. Perhaps one of the most well-known is the stochastic gradient descent (SGD), however the application of this method requires delicate tuning of the learning rate. The Adam algorithm is a variant of SGD and helps reduce the sensitivity in tuning the learning rate. Thus, it is considered for simplicity of implementation.

The proposed system 110 follows the data flow shown in FIG. 1. The input vector comes from the antennas—that is, the raw voltage magnitudes are presented as inputs. In at least one embodiment, no other information is required (such as frequency or phase), and only a single instance of the channel state is presented at a time (with no memory or recurrence) for estimation. The inclusion of phase and frequency information may improve the accuracy of direction finding at the cost of greater complexity of the receiver's hardware and deployment.

Figure 2:
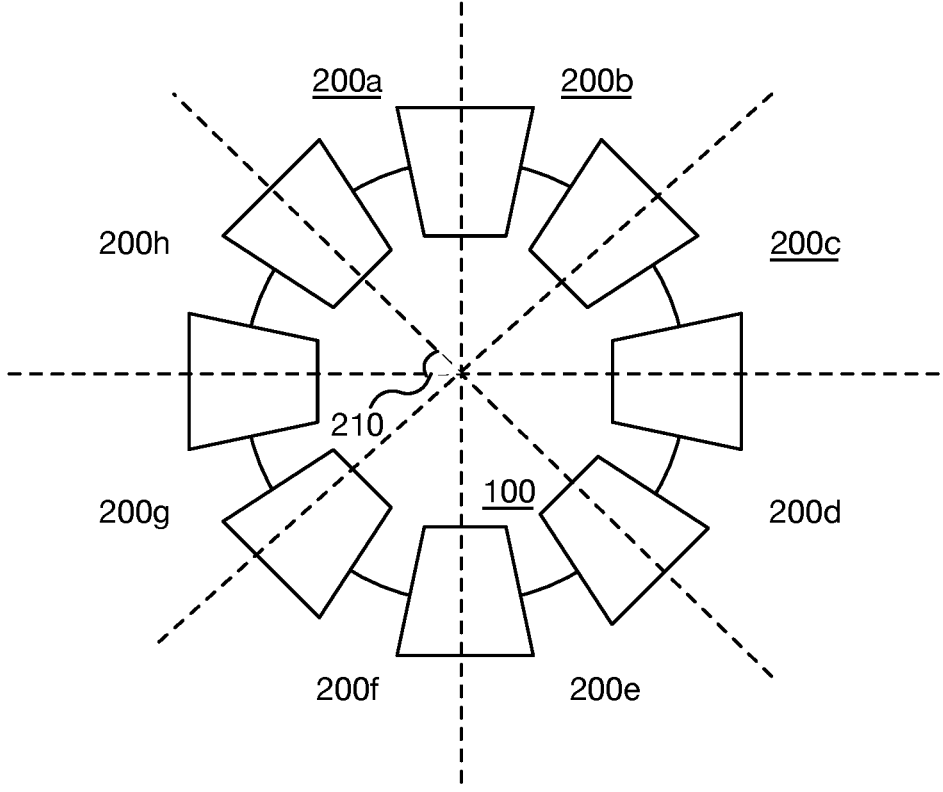
FIG. 2 illustrates a top view of a circular array and a system for angle of arrival estimation.

The first algorithm 112 is a machine-learning based algorithm which estimates the subregion the signal falls in. Here the subregion is defined as the azimuthal (angular) separation between the neighboring elements as shown in FIG. 2. FIG. 2 depicts a top view of an example array 100, with the subregion 200h exemplifying one angular subregion being associated with a 45 degree angle 210 portion of the array 100. The number of channels, N, is the same as the number of elements $N_e$.

Typically, systems require the processing of N parallel networks specifically trained for each of the N subregions 200(a-h). At least one embodiment leverages the geometrical symmetry of the array 100 and utilize a simple circular shift operation 114 to change the frame of reference of the latter network. Once the data is shifted, it is then fed to the second algorithm 116. This model outputs 118 an estimation of the subregion angle, which can easily be converted to an azimuth value.

In at least one embodiment of the disclosed system architecture, the number of required models does not change with the number of subregions 200(a-h), whereas it does with conventional implementations. The size of the models used (i.e., input and hidden layer width) may change based on a number of factors including the number of antennas 120(a-h), radiation pattern stability over frequency, bandwidth of the aperture, and the field of view considered in zenith. Since the number of subregions 200(a-h) is dictated by the number of antennas 120(a-h), and only a single model is needed to cover the full azimuthal FOV, an advantage of this architecture is in the actual system realization.

Any machine learning algorithm or other classical technique can be used for implementing the subregion classification block (i.e., the first algorithm 112). In the case of a deep neural network, the size of the network may grow in width due to the same, aforementioned factors. Other techniques may be used such as support vector machines, decision trees, random forests, or look-up tables. Support vector classification is a suitable candidate but requires some extra considerations (such as error-correcting output codes) to accommodate the multi-class classification, which inevitably increases the required footprint. The use of random forests, which ensembles numerous decision trees (with bagging and feature bagging), or just using the decision trees themselves, is also valid. However, the ensemble approach is notorious for the increased processing time associated with an elevated number of parallel decision trees. Conventional techniques such as look-up tables also undermine the main advantage of the speed and size reduction demonstrated through the proposed architecture. A deep neural network may be selected for intuitively being more likely to capture the frequency dependent fluctuations in antenna radiation patterns, while operating quickly and with a reduced footprint. The modularity of the proposed architecture does support any number of suitable classification techniques, and the particular choice is ultimately up to the system designer.

As discussed above the inputs to our system are the voltages at the antenna terminals. All local and global outputs of our system include those voltages, the subregion (m), and the subregion azimuthal angle of arrival. To quantify the performance of the network, it is important to keep track of other information such as the SNR and frequency. In the depicted embodiment, the training of the azimuth estimator (i.e., algorithm 116) requires only an azimuthal range of 45°, as this is the subsystem's FOV. On the other hand, the subregion classifier (i.e., algorithm 112) requires the full 360° as that is the system FOV. These two networks are trained separately backed by reasoning analogous to the interdependence argument frequently used to motivate the use of dropout. More explicitly, when training the two together, the classifier 112 can be disincentivized to classify accurately as the azimuth estimator network 116 could learn to compensate for the mistakes. This is avoided by training the two separately, thus facilitating better individual performance of the subsystems.

In the depicted embodiment, the field of view of the system, $FOV_{sys}$, is 360° in azimuth. The number of elements and subregions, N, is 8. The subregion classification, m, yields a range of circular shift values from 0 to N−1 (7). The intended operating band of interest is from 1.5 to 5.5 GHZ, with SNR values considered from 10 to 40 dB, and 0 values ranging from 30° to 90°.

Both neural networks may be defined in MATLAB utilizing its Deep Learning Toolbox. The subregion classifier 112 may be a deep NN with an 8-element input and an 8-element output. There are 8 hidden, fully connected layers of width 256, each using a leaky ReLU activation function. A Softmax layer may precede the output layer. Softmax assigns probabilities such that the overall output probability is 1, and the maximum probability corresponds to the estimated subregion. The network can be trained using the Adam optimizer on a dataset of 2,000,000 samples (with 601 seconds for extraction of fields from simulation and 53.4 seconds for dataset generation). The training, validation, and testing split is 85%, 10%, and 5%, respectively.

The subregion estimator 112 may also utilize a deep NN architecture. It may comprise an eight-value input layer and a single value output layer. Between them is 8 fully connected layers of width 256. After each of the hidden layers may be a leaky ReLU activation function. The Adam optimizer is used with the same data ratios as before: 85% for training, 10% for validation, and 5% for testing of a dataset of 2,000,000 signals—each with random noise. The data is generated to have a uniform distribution across frequency, azimuth, elevation, and SNR. Both networks may be trained for 100 epochs (complete traversals of the training data) on a Tesla K80 GPU.

Disclosed embodiments may be more consistent than conventional correlation methods. At high SNRs, the correlation method may outperform the ML-based approach, but it is not consistent. At least one advantage of the disclosed machine learning method is its speed—the implementation of a NN can be conceptualized as matrix multiplication. It does not necessitate the time-intensive peak finding that the correlation method requires.

In at least one embodiment, the average decision time is 12.1 and 80.3 ms for the proposed ML and correlation approaches, respectively. Furthermore, the standard deviation obtained is 1 ms for the proposed method, but 8.2 ms for the correlation method. Overall, the proposed approach experiences a minimum speedup of 85% (6.6×) compared to the low-resolution alternative.

To deploy a system like this in the field, storage may also be a consideration. For the proposed approach, the footprint is computed by summing the sizes (in bytes) of both neural networks. In the exemplary embodiment discussed above, the system has a footprint of 3.61 MB. The footprint of the correlation method is simply the size of the steering vector dataset. For the (measured) 6°/3° elevation/azimuth resolution, the footprint is 18.39 MB. Using simulated data with the same resolution that the NNs were trained on yields a footprint of 81.98 MB. Thus, the proposed approach has, at a minimum, an 80%-95% reduction in size compared to conventional systems.

Disclosed embodiments include a generalized machine learning architecture introduced and demonstrated for single-snapshot amplitude-only direction finding. The reuse of a subregion angle of arrival estimator is leveraged in conjunction with a uniform circular array to facilitate reduced computational footprint upon deployment. A deep neural network predicts the octant the signal falls in, and another neural network performs AoA estimation within that octant. When compared to conventional methods and systems, in at least one embodiment, (a) the footprint is reduced by 80-95%; (b) accuracy is better for 52-85% for SNRs in 10 to 40 dB range; and (c) a minimum speedup of 85% are obtained.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
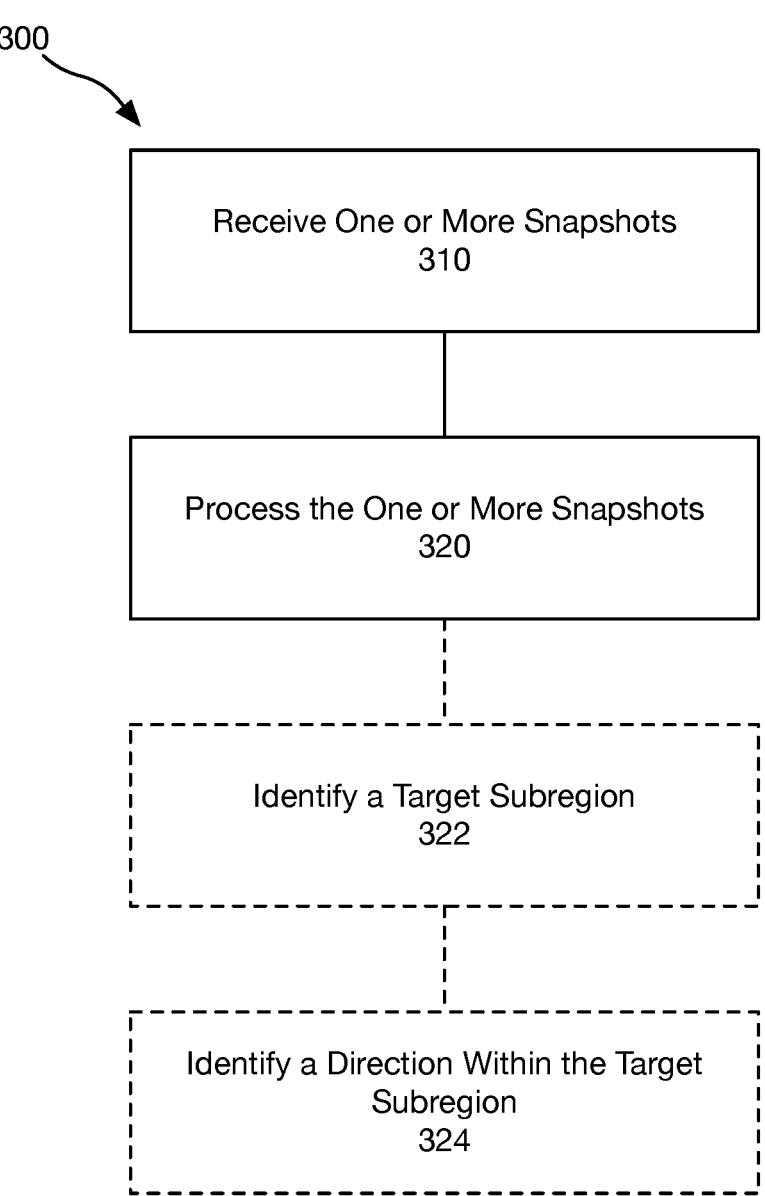
FIG. 3 depicts a flow chart of a method for angle of arrival estimation.

FIG. 3 depicts a flow chart of a method 300 for angle of arrival estimation. Method 300 includes an act 310 of receiving one or more snapshots. Act 310 comprises receiving one or more snapshots from a circular array of antennas. For example, the circular array 100 of FIG. 1 may receive signals in the form of voltage or power amplitudes. Further, in at least one embodiment, the one or more snapshots may comprise only voltage amplitudes or power amplitudes.

Method 300 may further comprise an act 320 of processing the one or more snapshots. Act 320 comprises processing the one or more snapshots for amplitude and/or phase-based direction finding using two cascaded algorithms. For example, act 320 may comprise the act 322 shown in a dashed box of identifying a target subregion and the act 324 shown in a dashed box of identifying a direction within the target subregion. For instance, act 322 may comprise a first algorithm of the two cascaded algorithms that is configured to identify a target subregion from which a signal arrives. Act 324 may comprise a second algorithm of the two cascaded algorithms that is configured to identify a direction of the signal within the target subregion. As such, disclosed embodiments may utilize two separate equations, one for identifying a subregion and a second for identifying a direction of the signal within the subregion.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FP-GAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for angle of arrival estimation comprising:

one or more processors; and one or more computer-readable media having stored thereon executable instructions that when executed by the one or more processors configure the computer system to:

receive a single snapshot from a circular array of antennas, wherein the antennas are configured to receive a signal and circularly arranged in a circle;

process the single snapshot for finding a direction of the signal using two cascaded algorithms;

perform, by a first algorithm of the two cascaded algorithms, a circular data-shift operation, which corresponds to a circular configuration of the circular array of antennas, only on an amplitude vector of the single snapshot to identify a target subregion, from which a signal arrives, where the target subregion is defined by an azimuthal angle and separated from neighboring subregions; and identify, by a second algorithm of the two cascaded algorithm, an angle of arrival of the signal within the subregion, wherein:

the angle of arrival is independent of the azimuthal angle of the target subregion.

2. The computer system as recited in claim 1, wherein the first algorithm comprises a first machine learning algorithm, wherein the first machine learning algorithm is trained to identify the target subregion from which the signal arrives.

3. The computer system as recited in claim 1, wherein the second algorithm comprises a second machine learning algorithm, wherein the second machine learning algorithm is trained to identify the angle of arrival of the signal within the target subregion.

4. The computer system as recited in claim 1, wherein the second algorithm identifies the angle of arrival of the signal within any subregion received from the first algorithm.

5. The computer system as recited in claim 1, wherein the amplitude of the signal is an amplitude voltage or amplitude power readings.

6. A computer-implemented method, executed on one or more processors, for angle of arrival estimation, the computer-implemented method comprising:

receiving a single snapshot from a circular array of antennas, wherein the antennas are configured to receive a signal and circularly arranged in a circle;

processing the single snapshot for finding a direction of the signal using two cascaded algorithms;

performing, by a first algorithm of the two cascaded algorithms, a circular data-shift operation, which corresponds to a circular configuration of the circular array of antennas, only on an amplitude vector of the single snapshot to identify a target subregion, from which a signal arrives, where the target subregion is defined by an azimuthal angle and separated from neighboring subregions; and identifying, by a second algorithm of the two cascaded algorithm, an angle of arrival of the signal within the subregion, wherein:

the angle of arrival is independent of the azimuthal angle of the target subregion.

7. The computer-implemented method as recited in claim 6, wherein the first algorithm comprises a first machine learning algorithm, wherein the first machine learning algorithm is trained to identify the target subregion from which the signal arrives.

8. The computer-implemented method as recited in claim 6, wherein the second algorithm comprises a second machine learning algorithm, wherein the second machine learning algorithm is trained to identify the angle of arrival of the signal within the target subregion.

9. The computer-implemented method as recited in claim 6, wherein the second algorithm identifies the angle of arrival of the signal within any subregion received from the first algorithm.

10. The computer-implemented method as recited in claim 6, wherein the amplitude of the signal is an amplitude voltage or amplitude power readings.

11. A computer-readable medium comprising one or more physical computer-readable storage media having stored thereon computer-executable instructions that, when executed at a processor, cause a computer system to perform a method for angle of arrival estimation, the method comprising:

receiving a single snapshot from a circular array of antennas, wherein the antennas are configured to receive a signal and circularly arranged in a circle;

processing the single snapshot for finding a direction of the signal using two cascaded algorithms;

performing, by a first algorithm of the two cascaded algorithms, a circular data-shift operation, which corresponds to a circular configuration of the circular array of antennas, only on an amplitude vector of the single snapshot to identify a target subregion, from which a signal arrives, where the target subregion is defined by an azimuthal angle and separated from neighboring subregions; and identifying, by a second algorithm of the two cascaded algorithm, an angle of arrival of the signal within the subregion, wherein:

the angle of arrival is independent of the azimuthal angle of the target subregion.

12. The computer-readable medium as recited in claim 11, wherein the first algorithm comprises a first machine learning algorithm, wherein the first machine learning algorithm is trained to identify the target subregion from which the signal arrives.

13. The computer-readable medium as recited in claim 11, wherein the second algorithm comprises a second machine learning algorithm, wherein the second machine learning algorithm is trained to identify the angle of arrival of the signal within the target subregion.

14. The computer-readable medium as recited in claim 11, wherein the second algorithm identifies the angle of arrival of the signal within any subregion received from the first algorithm.

* * * * *